UNITED STATES PATENT OFFICE.

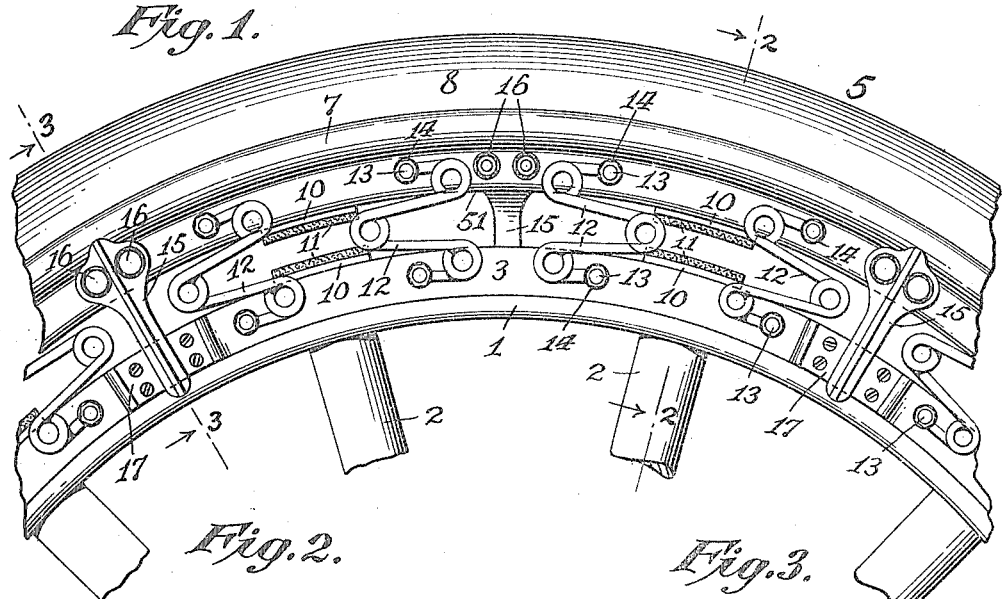

THOMAS CAPPARELLA AND NATHAN MALLONE, OF NEW YORK, N. Y.

TIRE FOR VEHICLES.

1,135,876. Specification of Letters Patent. Patented Apr. 13, 1915.

Application filed February 13, 1913. Serial No. 748,266.

*To all whom it may concern:*

Be it known that we, THOMAS CAPPARELLA and NATHAN MALLONE, citizens of the United States and residents of the city of New York, in the county of New York and State of New York, have invented new and useful Improvements in Tires for Vehicles and the like, of which the following is a specification.

Our invention relates to improvements in tires for vehicles and more particularly the class of tires known as automobile tires and the like, and the objects of our invention are first to provide a solid tread member, second to afford facilities for absorbing the vibration caused by the irregularties of the surfaces the tread member comes in contact with, and third to produce as efficiently as possible the same resilient action characteristic of the regular pneumatic tire.

The disadvantages of pneumatic tires with respect to punctures of the air tubes are well known. Our invention provides a tire that is very resilient without the use of air under pressure, and therefore escapes the great inconveniences and enormous expense through punctures of shoes and tubes.

We attain these objects by the mechanism illustrated in the accompanying drawing in which—

Figure 1, is a detail side elevation of a portion of the tire and wheel. Fig. 2, is a vertical section thereof on the plane of the line 2,—2, of Fig. 1. Fig. 3, is a similar view on the plane of the line 3,—3, of Fig. 1. Fig. 4, is a detail plan view of a portion of the felly, and Fig. 5, is a side elevation of one of the springs.

Our device consists chiefly of specially arranged springs in the space between an independent floating tread member and the felly of a wheel.

The springs are disposed in pairs on either side of the wheel and their positions are reversed alternately with respect to each other, these positions are also staggered with respect to those on the other side of the wheel.

The springs may be varied in size and strength to properly support vehicles of different weight, or in proportion to the load intended to be carried, and are of sufficient quality and so arranged that the use of lubricants is entirely eliminated since there is little or no friction.

In the drawings, 1, is the felly of a wheel provided with the usual spokes 2, and 3 is an annular angle iron extending over the periphery of the felly and forming a portion of the one side thereof, a flat ring 4, forms a portion of the opposite side. A tread member is indicated at 5, and comprises a rim 51, provided with a flat metal tire 6, and tread retaining flanges 7,—7, in which is mounted a tread 8, of flexible elastic material with a central groove or recess 9. Oppositely mounted in channels 10,—10, on the felly 1, and the rim 51, and at suitable intervals are striking blocks 11,—11, of soft elastic material, preferably solid rubber.

U-shaped springs 12,—12, composed of three coils are secured to the tread rim and wheel felly by square bolts 13,—13, provided with threaded ends. These bolts pass entirely through the rim and felly, and are secured by nuts 14, 14, and square apertures 120,—120, in the springs prevent them from turning.

Radial positioning arms 15,—15, are secured by bolts 16,—16, to the rim 51, and project inwardly and on either side of the wheel felly 1. They are alternately arranged between the pairs of U shaped springs 12,—12, and in staggered relation with respect to either side of the wheel.

Guide channel irons 17,—17, are secured to the wheel felly 1, and are adapted to be engaged by and limit the movement of the arms 15,—15. In the use of the tire there is a constant movement of the tread member which is absorbed by the springs and distributed among their three coils so that each coil does one third of the work of the spring thereby prolonging the life of the springs and retaining their elastic power, and reducing to a minimum their tendency to break.

The striking blocks 11,—11, are seldom needed, and only act in cases of violent impact caused by extremely rough roads thereby relieving the springs of unnecessary strain. Under such conditions the blocks engage each other reducing the vibration of the impact of the tread member with the wheel felly.

The arms 15,—15, and guide channel irons 17,—17, are likewise used infrequently, and serve when rounding a sharp curve, skidding, or in a sudden stop, to prevent too great a displacement of the tread member although under ordinary conditions the elastic power of the springs is sufficient for this purpose.

Having now described our invention, what we claim is:

The combination of a wheel felly and a tire-carrying rim arranged in spaced and normally concentric relation to each other and of equal width, a circular series of bolts passing transversely through said felly, and a similar series of bolts bearing the same relation to said rim, all of said bolts having end portions non-circular in cross section, two circular series of springs located at opposite sides of said felly and rim and connecting the same, each of said springs having a non-circular hole in each extremity thereof receiving one of said bolts and embodying a plurality of arms in zigzag relation to each other and lying in different planes, and helical coils connecting the convergent extremities of said arms, radial positioning arms forming driving connections between said rim and felly, and pairs of striking blocks secured to the opposing faces of said felly and rim, and arranged in opposing relation to one another.

Signed at the city of New York, county of New York, and State of New York, this 10th day of February, 1913.

THOMAS CAPPARELLA.
NATHAN MALLONE.

Witnesses:
ABRAHAM WEBER,
MORIN M. FREHLICH.

Copies of this patent may be obtained for five cents each, by addressing the "Commissioner of Patents, Washington, D. C."